Jan. 13, 1942.                P. MULLER                    2,270,169
                    SHORT WAVE ELECTRON CONDENSER
                        Filed July 2, 1936
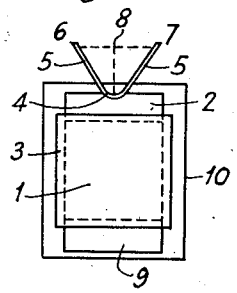
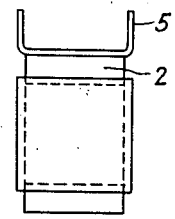
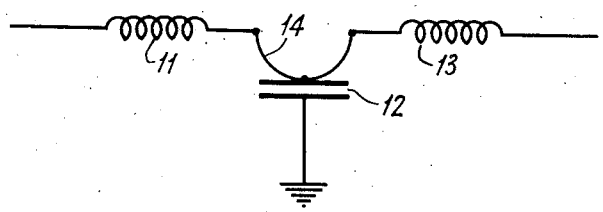
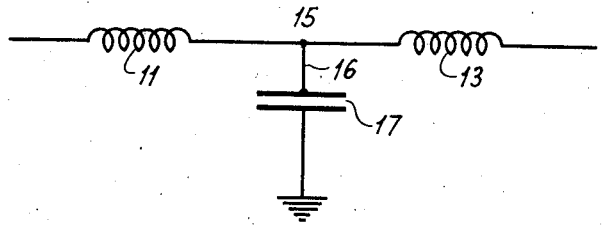
INVENTOR
PAUL MULLER
BY
ATTORNEY Patented Jan. 13, 1942

2,270,169

UNITED STATES PATENT OFFICE 2,270,169

SHORT WAVE ELECTRON CONDENSER

Paul Muller, Berlin, Germany, assignor to Telefunken Gesellschaft für Drahtlose Telegraphie m. b. H., Berlin, Germany, a corporation of Germany Application July 2, 1936, Serial No. 88,509
In Germany July 13, 1935

2 Claims. (Cl. 250—16)

The invention relates to an improved short wave condenser connection and also to a special method of construction for electric condensers to be used primarily in the short wave field.

In the wound layer condensers hitherto known in the prior art, wires were frequently soldered to the condenser conductive layers to be later connected to soldered connections which are generally passed through the shell of the casing containing the wound condenser. In such an arrangement, a part of the current passes from the soldered connection across a special lead to the condenser, which is placed between said connection and the condenser layer. This structure has the disadvantage in condensers for short waves and ultra-short waves, in that the lead wire between the soldered connection and the actual condenser winding represents a considerable self-induction. The latter when arranged in for instance a filter circuit, increases the apparent resistance of the entire circuit and it is detrimental insofar as it is always desired to keep the apparent resistance of the condenser including the leadin wires to the conductive layers as low as possible.

In accordance with the invention, the detrimental self-induction of the additional wire between soldering connection and condenser turns is avoided by having the lead wire directly connected to the condenser layer thereby eliminating a leadin which results in undesired self-induction. The place of connection may be made so as to form an effective self-induction for the course of the current.

In accordance with a further scheme of my invention, the place of making the soldered connection must be matched as regards current load, with the wires or coils placed in front or in back thereof. At high current loads the cross-section of the soldered connection is made in the shape of a bent strap and must be dimensioned sufficiently strong to carry the high current load without large losses. The connection between the bent soldered part and one layer of the condenser winding is preferably provided in the manner of a direct joint such as by way of soldering i. e. possibly without any intermediate connection line. In case of a large number of connection lines having large cross-sections carrying the same potential, the connections are preferably to be distributed over several soldering parts.

The arrangement will be advantageously constructed if a bent part is directly joined with the condenser turns, whereby said part of the condenser turns forms at the same time a part of the connection line. In this way, no detrimental self-induction will be produced.

Under certain conditions, it may be of advantage instead of directly soldering as mentioned above, the soldering terminal for the one turn to the one side of the turn, to use between the one condenser layer and the soldering part a very short leadin, as a result of which a rigid connection between the soldering part and the turn is avoided. This is important especially in case of strong soldering bends. If the connection is too rigid, the place of soldering may be subjected to an unfavorable stress. In this case, the soldering ear is permitted a certain movability relative to the condenser windings which may be of advantage in assembling the entire condenser turns. The dimensions of the winding sometimes reveal in the manufacture certain deviations, making it difficult to maintain an accurate position of the soldering ear relative to the condenser winding. In case of low current loads the condenser soldering ear is formed of a sheet metal strip permitting an additional bending or alinement.

This invention will best be understood by referring to the accompanying drawing, in which:

Fig. 1 is a side view of an improved condenser connection;

Fig. 2 is a side view of another embodiment of an improved condenser connection;

Fig. 3 is a schematic circuit diagram of a filter circuit employing condenser connections of this invention; and Fig. 4 is a schematic circuit diagram of a filter circuit showing condenser connections known in the prior art.

In the figures, an embodiment of a condenser in accordance with the invention is schematically shown.

In Fig. 1, at one side the condenser layer 2 is extended somewhat beyond the paper strip 3 on a condenser winding 1. The winding is formed into a spiral shape in a manner known in the prior art. The protruding side of the wound layer 2 is soldered in such manner that the interspaces of the spiral are filled out thereby providing a large soldering surface. To this surface there is soldered a short bent part 4 of copper sheeting or of any other material having good electrical conductivity. The copper strap 4 has a soldering ear 5 at each end. The current is supplied to the condenser layer 2 for instance at the left side 6, the output taking place across the right side 7 of the soldering ear 5. As distinct from the ordinary structure in which the line is brought out directly between 6 and 7 as indicated by dash lines and a separate line to the layer 2 placed at the place 8 as likewise indicated in dash lines, the connecting line 8 which introduces a detrimental self-induction, is omitted. The connecting between the points 6 and 7 is carried out across the soldering bent ear 5 inserted in the conducting train and directly joined with the layer 2 of the condenser in avoiding a separate leadin. The second condenser layer 9 extended at the other side of the wound layer is placed at the casing 10 of the container into which the winding is inserted, and preferably soldered directly to the outside of the container.

Fig. 2 shows a further construction of the soldering ear according to Fig. 1, whereby the soldering ear 5 is placed directly on the condenser layer 2.

Fig. 3 represents an electrical circuit diagram of a condenser according to the invention as inserted in the conducting train. The chokes 11 and 13 together with the condenser form a filter circuit. Since as indicated in the figure, the leadin to the condenser is placed directly in the conducting train and between the two chokes 11 and 13, it represents as such a part of the self-induction of the chokes 11 and 13. Thus it offers a useful self-induction.

On the contrary, Fig. 4 shows the hitherto customary structure. The chokes 11 and 13 placed in the conductor train are connected across a wire line to each other and from a branch point 15 of said line a connection 16 is placed at the condenser 17. In this circuit, the detrimental self-induction furnished by the line 16 assumes considerable values.

The new condenser arrangement is not only applicable in case of wound condensers, but may also be applied for instance in the case of electrolytic condensers.

What is claimed is:

1. In a high frequency circuit arrangement, a condenser element having two electrodes of conducting foil with dielectric layers interposed therebetween, said conducting foils projecting between the dielectric layers in opposite directions from one another, and a metallic sheet terminal member bent in the form of a V having its lower bent portion soldered to at least one of the conducting foils at the central portion thereof, the two upward extending ends of said sheet terminal member arranged to have one serve as an input terminal and the other as an output terminal, said other conducting foil arranged to be connected to ground or equivalent potential.

2. In a high frequency circuit arrangement, a condenser element having two electrodes of conducting foil with dielectric layers interposed therebetween, said conducting foils projecting between the dielectric layers in opposite directions from one another, a metallic container for said condenser element, and a metallic sheet terminal member bent in the form of a V having its lower bent portion soldered to at least one of the conducting foils at the central portion thereof, the two upward extending ends of said sheet terminal member extending beyond the said container and arranged to have one serve as an input terminal and the other as an output terminal, said other conducting foil arranged to be connected to said metallic container.

PAUL MULLER.